United States Patent
Zhu et al.

(10) Patent No.: US 9,781,713 B2
(45) Date of Patent: Oct. 3, 2017

(54) METHOD AND RADIO NETWORK NODE FOR ENABLING SWITCH OF TRANSMISSION MODE FOR A USER EQUIPMENT

(71) Applicant: Telefonaktiebolaget L M Ericsson (publ), Stockholm (SE)

(72) Inventors: Huaisong Zhu, Beijing (CN); Xinghua Song, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/787,350

(22) PCT Filed: May 6, 2013

(86) PCT No.: PCT/CN2013/075179
§ 371 (c)(1),
(2) Date: Oct. 27, 2015

(87) PCT Pub. No.: WO2014/179916
PCT Pub. Date: Nov. 13, 2014

(65) Prior Publication Data
US 2016/0066301 A1   Mar. 3, 2016

(51) Int. Cl.
*H04W 72/04*   (2009.01)
*H04W 72/08*   (2009.01)
(Continued)

(52) U.S. Cl.
CPC .......... *H04W 72/042* (2013.01); *H04L 43/16* (2013.01); *H04W 28/18* (2013.01); *H04W 72/085* (2013.01); *H04W 88/06* (2013.01)

(58) Field of Classification Search
CPC . H04W 72/042; H04W 72/085; H04W 28/18; H04W 88/06; H04L 43/16
See application file for complete search history.

(56) References Cited

U.S. PATENT DOCUMENTS 7,027,816 B2 * 4/2006 Kikuma ............... H04W 36/04
370/331
7,477,702 B2 * 1/2009 Tang ..................... H04L 1/0003
370/252
(Continued)

FOREIGN PATENT DOCUMENTS

CN         1852606 A     10/2006
CN       102025460 A      4/2011
(Continued)

OTHER PUBLICATIONS

Adaptive MIMO Transmission Scheme: Exploiting the Spatial Selectivity of Wireless Channels by Antonio Forenza et al.; Wireless Networking and Communications Group (WNCG) Department of Electrical and Computer Engineering; The University of Texas at Austin, TX, USA; Communications and Networking Lab Samsung Advanced Institute of Technology (SAIT), Suwon, Korea, 2005.
(Continued)

*Primary Examiner* — Rasheed Gidado
(74) *Attorney, Agent, or Firm* — Baker Botts, LLP (57) ABSTRACT

A method and a radio network node (800) for enabling a switch between transmission modes for sending downlink signals to a User Equipment, UE. A switching unit (800a) selects a first transmission mode when downlink signal quality in the UE is above a switching threshold (Th), and selects a second transmission mode when the downlink signal quality is below the switching threshold. An obtaining unit (800c) obtains a first performance level when the first transmission mode is used and the downlink signal quality is within a specific vicinity range from the switching threshold, and obtains a second performance level when the second transmission mode is used and the downlink signal quality is within the specific vicinity range. An adjusting unit (800d) then adjusts the switching threshold (Th) based on a deviation between the first performance level and the second
(Continued)

performance level. Thereby, the adjusted switching threshold may be more or less optimized and used to achieve the best possible performance under the currently prevailing circumstances regardless of the downlink signal quality. (FIG. 8)

8 Claims, 4 Drawing Sheets (51) Int. Cl.
*H04L 12/26* (2006.01)
*H04W 28/18* (2009.01)
*H04W 88/06* (2009.01)

(56) References Cited

U.S. PATENT DOCUMENTS

| | | | |
|---|---|---|---|
| 7,881,389 B2* | 2/2011 | Cheng | H04L 1/003 375/260 |
| 8,000,343 B1* | 8/2011 | Ooe | H04L 29/08729 370/465 |
| 8,089,939 B1 | 1/2012 | Mater et al. | |
| 8,265,041 B2* | 9/2012 | Mason | H04W 36/06 370/336 |
| 9,250,665 B2* | 2/2016 | Avkarogullari | G06F 1/206 |
| 9,363,005 B2* | 6/2016 | Mahe | H04B 7/0825 |
| 2005/0141476 A1* | 6/2005 | Choi | H04W 74/0808 370/348 |
| 2005/0276317 A1 | 12/2005 | Jeong et al. | |
| 2008/0159203 A1 | 7/2008 | Choi et al. | |
| 2009/0227249 A1 | 9/2009 | Ylitalo | |
| 2011/0243100 A1 | 10/2011 | Ball et al. | |
| 2012/0287876 A1 | 11/2012 | Kazmi et al. | |
| 2014/0280886 A1* | 9/2014 | Burns | H04L 43/04 709/224 |

FOREIGN PATENT DOCUMENTS

| | | | | |
|---|---|---|---|---|
| SE | EP 1263158 A1 * | 12/2002 | | H04L 1/0001 |
| WO | WO 2008/115700 A1 | 9/2008 | | |
| WO | WO 2010/088721 A1 | 8/2010 | | |
| WO | WO 2013/003973 A1 | 1/2013 | | |

OTHER PUBLICATIONS

PCT International Search Report for International application No. PCT/CN2013/075179, dated Feb. 13, 2014.
3GPP TS 36.211 v8.7.0; Technical Specification; 3rd Generation Partnership Project; Technical Specification Group Radio Access Network; Evolved Universal Terrestrial Radio Access (E-UTRA); Physical Channels and Modulation (Release 8), May 2009.
3GPP TS 36.331 v9.2.0; Technical Specification; 3rd Generation Partnership Project; Technical Specification Group Radio Access Network; Evolved Universal Terrestrial Radio Access (E-UTRA); Radio Resource Control (RRC); Protocol specification (Release 9), Mar. 2010.
EPO issued extended European search report for Application No. /Patent No. 13884311.5-1857 / 2995160 PCT/CN2013075179—dated Nov. 10, 2016.

* cited by examiner

METHOD AND RADIO NETWORK NODE FOR ENABLING SWITCH OF TRANSMISSION MODE FOR A USER EQUIPMENT

PRIORITY

This nonprovisional application is a U.S. National Stage Filing under 35 U.S.C. §371 of International Patent Application Serial No. PCT/CN2013/075179, filed May 6, 2013, and entitled "Method And Radio Network Node For Enabling Switch Of Transmission Mode For A User Equipment."

TECHNICAL FIELD

The present disclosure relates generally to a method and a radio network node for enabling a switch between a first transmission mode and a second transmission mode for sending downlink signals to at least one User Equipment, UE.

BACKGROUND

In wireless communication networks for radio communication with user-controlled terminals or devices, it is often possible to select different transmission modes for transmitting downlink signals from a radio network node depending on the current circumstances. Such transmission modes may differ from one another in terms of, e.g., antenna arrangements, modulation/demodulation schemes, encoding schemes, beam forming, spatial multiplexing, transmit diversity, and so forth. In this disclosure, the term "User Equipment, UE" will be used to represent any wireless terminal or device capable of radio communication, including receiving downlink signals transmitted from a radio network node of a wireless communication network. The radio network node may be any node of a wireless communication network that can transmit downlink radio signals to UEs. The radio network node in this description may also be referred to as a base station, NodeB, e-NodeB, eNB, base transceiver station, etc.

For example, one transmission mode may be preferable to use and provide better performance to the downlink communication in one situation while another transmission mode may be better to use in another situation. In this context, the performance of a communication may be represented by achieved throughput, i.e. the amount of data communicated per time unit which may be measured in bits per second, bps. These situations typically refer to different conditions of a used radio channel which are highly dependent of the geographical location of the UE. In general, when a UE is located relatively close to the transmitting radio network node the UE experiences better channel conditions and signal quality than when the UE is located relatively far away from the radio network node, e.g. close to a cell edge, although other factors may also influence the channel conditions and signal quality such as occurrence of obstacles and signal reflections, which may be different, e.g., in rural and urban environments.

In current solutions, the signal quality is a factor of great importance to consider when selecting which transmission mode to use, and there are some well-known measurable parameters that may be used as indication of signal quality, such as Signal to Noise Ratio, SNR, Signal to Noise and Interference Ratio, SINR, Reference Signal Received Quality, RSRQ, and Channel Quality Indicator, CQI. Values of these parameters may be obtained on a continuous basis from measurements made by the UE and/or estimations made by the network, by means of well-known procedures which are not necessary to describe here in any detail.

In Long Term Evolution, LTE, Release 8, seven Transmission Modes, TMs, are defined for downlink, denoted as TM1-TM7. For example, TM2 is a "robust" mode and provides transmit diversity, and TM2 is often used as a fallback mode in situations of very poor signal propagation and quality due to, e.g., high path loss, severe interference, high terminal speed, etc. An antenna configuration with 8 physical-ports antenna is deployed in some LTE networks due to its high uplink receiving performance and downlink beam forming performance. In this case, either of transmission modes TM3 and TM7 is suitable to use for downlink data transmission depending on current signal quality. Of these modes, TM7 is a single-layer Multiple Input Multiple Output, MIMO, scheme where the 8-ports antenna may be used to form beams directed to the UE to achieve better coverage and higher downlink throughput than other transmission modes when the UE is located relatively far away from the transmitting radio network node. On the other hand, TM3 is an open loop MIMO scheme and provides better performance, such as downlink throughput, when the UE is located relatively close to the transmitting radio network node.

It can be readily understood that the signal quality may change rapidly, e.g. when the UE moves around, and ideally the transmission mode should be switched accordingly as follows, to achieve optimal performance. The obtained indication of signal quality may be used for evaluating a threshold condition such that a first transmission mode is selected when the signal quality is above a certain switching threshold while a second transmission mode is selected when the signal quality is below the switching threshold. A margin may be used in the threshold condition to avoid frequent switching back and forth between the transmission modes in a "ping-pong" manner when the signal quality fluctuates around the switching threshold. An example of a procedure for applying the above threshold condition in a radio network node for sending downlink signals to a UE is illustrated by a flow chart in FIG. 1.

Figure 1:
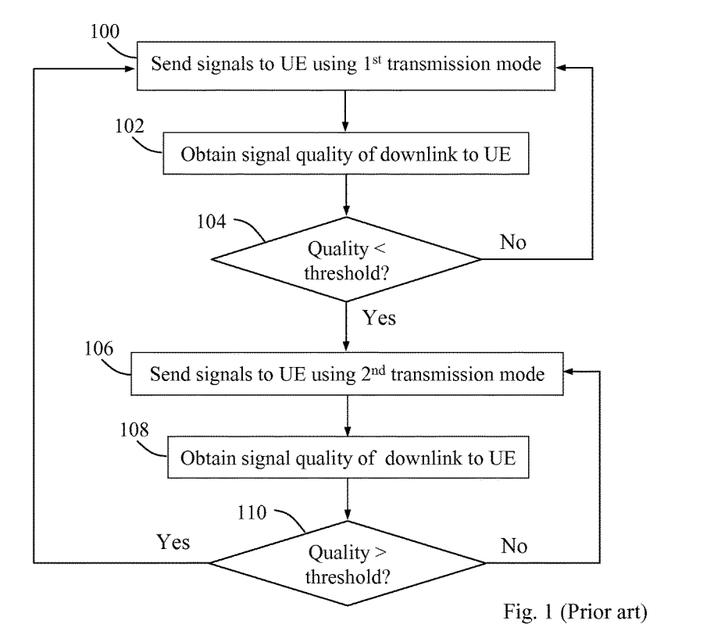
FIG. 1 is a flow chart illustrating how transmission mode is selected depending on signal quality, according to the prior art.

In a first shown action 100, the radio network node sends downlink signals to the UE using the first transmission mode which may be a default transmission mode that is used initially when the radio communication starts, i.e. before any signal quality has been obtained for that UE. In a next action 102, the radio network node monitors and obtains a signal quality of the downlink signals transmitted to the UE using the first transmission mode, e.g. from measurements made by the UE and/or estimations made by the network. It is then determined in an action 104 whether the obtained signal quality is, in this example, below the switching threshold, e.g. by a margin as mentioned above. If not, the radio network node continues to use the first transmission mode thus returning to action 100. On the other hand, if the signal quality is below the switching threshold, the radio network node sends downlink signals to the UE using the second transmission mode instead, in an action 106.

In a further action 108, the radio network node continues to monitor and obtain signal quality when using the second transmission mode. It is then determined in an action 110 whether the obtained signal quality has improved and is, in this example, above the switching threshold, e.g. by a margin which may be equal to or different than the margin mentioned in action 104 above. If the switching threshold is not exceeded, the radio network node continues to use the second transmission mode thus returning to action 106. On the other hand, if the signal quality is above the switching threshold, the radio network node switches transmission mode and sends signals to the UE using the first transmission mode again, by returning to action 100. In practice, it may be required that the conditions of actions 104 and 110 must be fulfilled for a minimum time before switching transmission mode. Further, it may be required that a new transmission mode has been used for a minimum time before switching back again to the previous mode.

Figure 2:
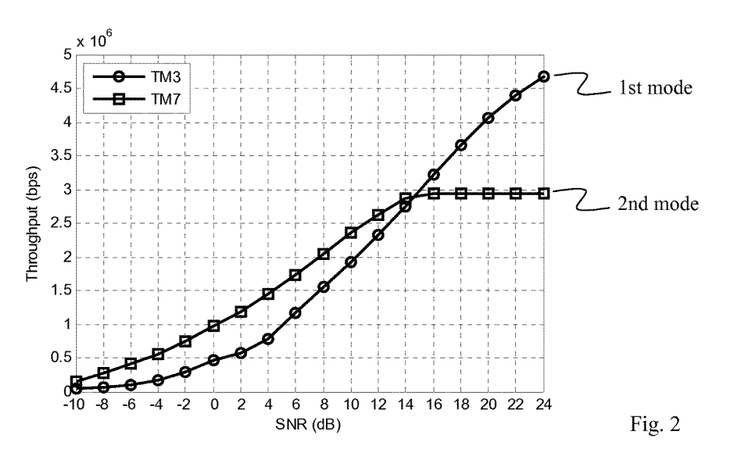
FIG. 2 is a diagram illustrating how throughput varies with SNR for two different transmission modes TM3 and TM7.

FIG. 2 is a diagram illustrating curves with measurements of a resulting downlink throughput at different signal qualities, here indicated by the parameter SNR in decibel, dB. The curve with circular points shows the throughput when using TM3 as the first transmission mode, and the curve with square points shows the throughput when using TM7 as the second transmission mode. The downlink throughput in this diagram is measured in bits per second, bps, $\times 10^6$. It can be seen that TM7 provides higher throughput than TM3 at relatively low SNR values, while TM3 provides higher throughput than TM7 at relatively high SNR values. Ideally, the switching threshold should in this example be around an SNR of 15 dB such that TM7 is used when SNR<15 dB and TM3 is used when SNR>15 dB, which would provide the highest possible throughput regardless of SNR.

As mentioned above, a threshold condition for determining which transmission mode to use may be defined as follows:

a first transmission mode is used when a quality of downlink signals received by a UE is above a switching threshold, possibly by a margin, and a second transmission mode is used when the quality of downlink signals received by the UE is below the switching threshold, possibly by another margin which may be the same as or different than the previous margin.

When such margins are used, the threshold condition could alternatively be defined by a first and a second threshold, respectively, the first threshold being somewhat higher than the second threshold.

However, it is a problem that the switching threshold is sometimes not optimal such that the best possible performance is not achieved at some quality levels. For example, when the switching threshold is too high, the second transmission mode is over-estimated and will be used even at a signal quality when the first transmission mode would actually provide better performance, i.e. throughput. Conversely, when the switching threshold is too low, the first transmission mode is over-estimated and will be used even at a signal quality when the second transmission mode would actually provide better performance. An incorrect setting of the switching threshold may thus result in deteriorated performance in downlink transmission to a UE.

SUMMARY

It is an object of embodiments described herein to address at least some of the problems and issues outlined above. It is possible to achieve this object and others by using a method and a node as defined in the attached independent claims.

According to one aspect, a method is provided in a radio network node of a wireless communication network, for enabling a switch between transmission modes used for sending downlink signals to at least one User Equipment, UE. It is assumed that a first transmission mode is used when a quality of downlink signals received by the at least one UE is above a switching threshold and a second transmission mode is used when said quality is below the switching threshold.

In this method, the radio network node obtains a first performance level pertaining to reception of the downlink signals in the at least one UE when the first transmission mode is used for sending the downlink signals and the quality of downlink signals received by the at least one UE is within a specific vicinity range from the switching threshold. The radio network node also obtains a second performance level pertaining to reception of the downlink signals in the at least one UE when the second transmission mode is used for sending the downlink signals and the quality of downlink signals received by the at least one UE is within the specific vicinity range from the switching threshold.

In this method, the radio network node further adjusts the switching threshold based on a deviation between the first performance level and the second performance level. Thereby, an accurate and reliable switching threshold can be achieved and applied such that the most favorable transmission mode of the first and second transmission modes will be used to provide as good performance as possible during downlink transmission to a UE, e.g. in terms of downlink throughput, in the currently prevailing circumstances and regardless of the quality of the downlink signals.

According to another aspect, a radio network node of a wireless communication network is provided. The radio network node comprises a switching unit configured to switch between transmission modes used for sending downlink signals to at least one UE and to select a first transmission mode when a quality of downlink signals received by the at least one UE is above a switching threshold, and to select a second transmission mode when said quality is below the switching threshold. The radio network node further comprises a transmitting unit configured to transmit said downlink signals to the at least one UE using one of the first and second transmission modes.

The radio network node also comprises an obtaining unit configured to obtain a first performance level pertaining to reception of the downlink signals in the at least one UE when the first transmission mode is used for sending the downlink signals and the quality of downlink signals received by the at least one UE is within a specific vicinity range from the switching threshold. The obtaining unit is also configured to obtain a second performance level pertaining to reception of the downlink signals in the at least one UE when the second transmission mode is used for sending the downlink signals and the quality of downlink signals received by the at least one UE is within the specific vicinity range from the switching threshold. The radio network node also comprises an adjusting unit configured to adjust the switching threshold based on a deviation between the first performance level and the second performance level.

The above method and radio network node may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable use of a switching threshold that is accurate and reliable such that a favorable transmission mode is used for downlink transmission to a UE, in order to provide as good performance as possible, e.g. in terms of downlink throughput, in the currently prevailing circumstances. This is achieved by adjusting the switching threshold when it is found that one of the two alternative transmission modes and its resulting performance are over-estimated while the signal quality received in the UE is within a limited vicinity range from, i.e. relatively close to, the currently used switching threshold, which will be explained and described in more detail below. In this way, the adjusted switching threshold may be more or less optimized in terms of the resulting performance.

Figure 3:
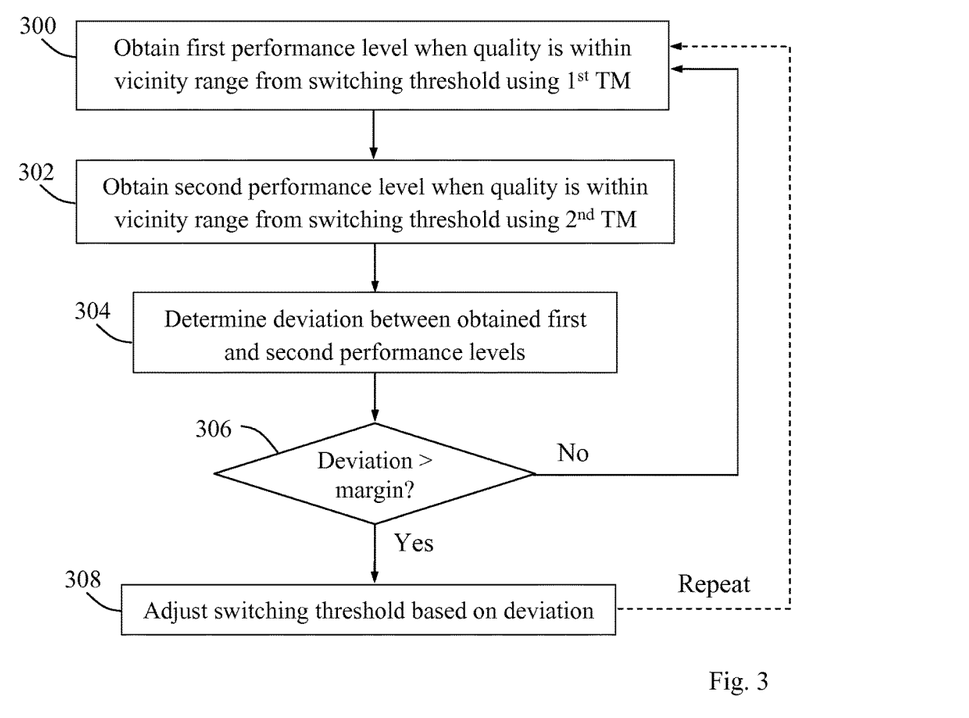
FIG. 3 is a flow chart illustrating a procedure in a radio network node, according to some possible embodiments.
Figure 4:
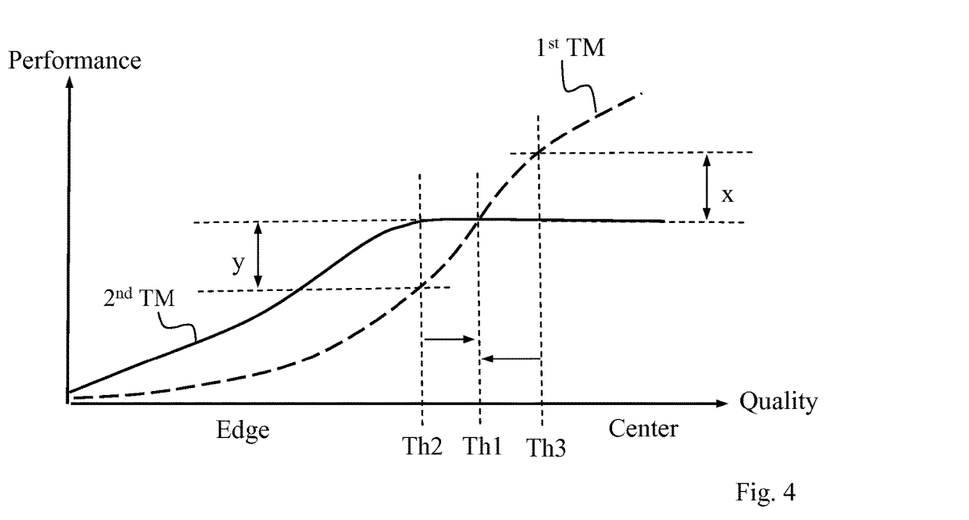
FIG. 4 is a diagram illustrating an example of how a threshold for switching transmission modes may be adjusted, according to further possible embodiments.

An example of a procedure for enabling a switch between transmission modes used for sending downlink signals to a UE, will now be described with reference to the flow chart in FIG. 3 showing actions performed by a radio network node of a wireless communication network. Throughout this disclosure, the term "a UE" is used for simplicity although it should be understood to imply at least one UE. In the procedure of FIG. 3, it is assumed that the radio network node uses a first transmission mode when a measured or estimated quality of downlink signals, or signal quality for short, received by the UE is above a switching threshold, and that the radio network node uses a second transmission mode when said signal quality is below the switching threshold. When describing FIG. 3, reference will also be made to the diagram in FIG. 4 showing how a performance level for the UE in this example varies with signal quality for the first transmission mode, "1$^{st}$ TM" dashed curve, and for the second transmission mode, "2$^{nd}$ TM" full curve.

Basically, the radio network node operates to switch between the first and second transmission modes depending on the quality of the downlink signals when received by the UE, which quality is used for evaluating a threshold condition in the manner described for FIG. 1. As indicated above, the quality of the downlink signals may be continuously measured and reported by the UE and/or estimated by the network, by using conventional techniques. Too frequent switching between the two transmission modes may be avoided by using a threshold margin or the like as described above, and/or by requiring that a transmission mode must remain in use for a minimum time before switching to the other transmission mode, which is however outside the scope of this solution.

In a first shown action 300, the radio network node obtains a first performance level pertaining to reception of the downlink signals in the UE when the first transmission mode is used for sending the downlink signals and the quality of downlink signals received by the UE is within a specific vicinity range from, or around, the switching threshold. The phrase "within a specific vicinity range from" should be understood such that the measured and/or estimated signal quality in the UE does not differ from the currently used switching threshold by more than a preset extent or amount. In this action, it may be suitable and sufficient to obtain the first performance level when the signal quality in the UE is more or less equal to the switching threshold.

A further action 302 illustrates that the radio network node also obtains a second performance level pertaining to reception of the downlink signals in the UE when the second transmission mode is used for sending the downlink signals and the quality of downlink signals received by the UE is within the specific vicinity range from, or around, the switching threshold. As said above, the first and second performance levels may pertain to downlink throughput, e.g. measured in bits per second, bps. Also in this action, it may be suitable and sufficient to obtain the second performance level when the signal quality in the UE is more or less equal to the switching threshold.

In practice, the first and second performance levels may be obtained in any order depending on how the signal quality varies, e.g. when the UE moves around, and how the transmission mode may be switched back and forth accordingly. For example, the first transmission mode may be used first for the UE, and then the second transmission mode may be used, and then the first transmission mode may be used again, and so forth. During these periods of using the first and second transmission modes in turn, the radio network node may measure the first and second performance levels, respectively, several times and then calculate some representative values therefrom. Hence, actions 300 and 302 may take place repeatedly any number of times and in any order.

In a following action 304, the radio network node determines a deviation, i.e. difference, between the first performance level obtained as of action 300 and the second performance level obtained as of action 302. The radio network node then determines, in another action 306, whether the deviation is above a certain margin. Basically, the radio network node determines in this action whether the deviation is large enough, i.e. above the margin, to warrant adjustment of the switching threshold or not. If so, it can be deduced that the switching threshold has not been optimally set and can be improved. Accordingly, the radio network node adjusts the switching threshold in an action 308, based on the deviation determined in action 304, which will be described in more detail later below. On the other hand, if the deviation is small enough to be within the margin in action 306, there is no point in adjusting the switching threshold which can be deemed to be more or less optimal. In that case, the procedure may return to action 300 for obtaining more up-to-date values of the first and second performance levels and possibly adjust the switching threshold later, if warranted depending on the outcome of action 306.

If the switching threshold has been set optimally, it would occur at a signal quality where the curves in FIG. 4 cross each other, that is at Th1, which is where the first and second performance levels are basically equal. In that case, the first transmission mode, dashed curve, would be used when the signal quality is above Th1 and the second transmission mode, full curve, would be used when the signal quality is below Th1, which would provide the best possible performance e.g. in terms of throughput for the UE across the entire quality range. Typically, the signal quality is below Th1 when the UE is located away from a transmitting antenna of the radio network node, which is more or less close to the cell edge, left side of Th1, while the signal quality is above Th1 when the UE is located relatively near the transmitting antenna, which is more or less close to the cell center, right side of Th1. As said above, there may be other factors than distance to the transmitting antenna that could influence the signal quality as well.

However, if the switching threshold has been set too low, e.g. at Th2 in FIG. 4, it will in this example occur at a signal quality where the second performance level is not equal to but higher than the first performance level such that the first transmission mode and resulting performance is thereby over-estimated. In that case, the switching threshold should be increased towards Th1 in action 308 above to become optimal or near-optimal. On the other hand, if the switching threshold has been set too high, e.g. at Th3 in FIG. 4, it will occur at a signal quality where the first performance level is higher than the second performance level such that the second transmission mode and resulting performance is thereby over-estimated. In that case, the switching threshold should be reduced towards Th1 in action 308 above to become optimal or near-optimal.

FIG. 4 further illustrates that when the switching threshold has been set to Th2, that is too low, the above deviation between the first performance level and the second performance level is indicated as "y" when the signal quality is at or near the switching threshold Th2. Similarly, when the switching threshold has been set to Th3, that is too high, the deviation between the first performance level and the second performance level is indicated as "x" when the signal quality is at or near the switching threshold Th3. The signal quality being at or near the switching threshold implies that the quality of downlink signals is within a specific vicinity range from the switching threshold, which phrase was used above.

Figure 5:
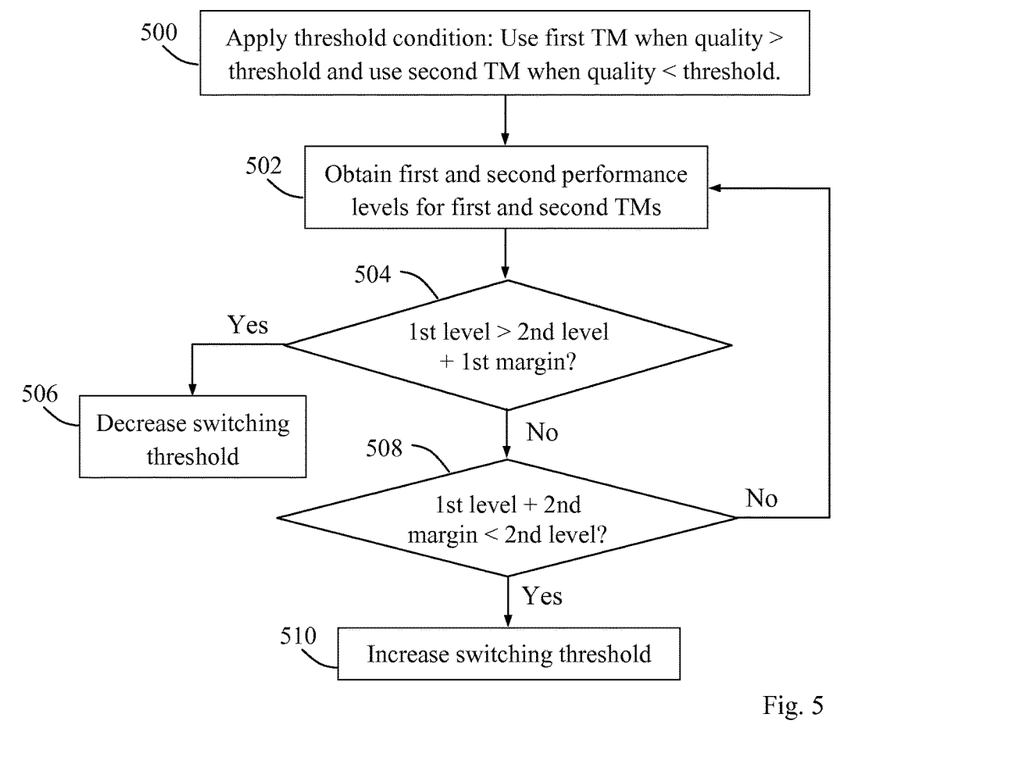
FIG. 5 is a flow chart illustrating a procedure in a radio network node for adjusting the threshold, according to some possible embodiments.

Another possible procedure for enabling a switch between transmission modes used for sending downlink signals from a radio network node to a UE, will now be described with reference to the flow chart in FIG. 5 showing actions performed by the radio network node which may be combined with the actions in FIG. 3 in a manner explained below. FIG. 5 specifically illustrates how the switching threshold can be adjusted depending on the deviation between the first performance level and the second performance level. In this example, the switching threshold is decreased when the first performance level is higher than the second performance level by a first margin, and the switching threshold is increased when the first performance level is lower than the second performance level by a second margin.

A first shown action 500 illustrates that the radio network node applies a threshold condition for evaluating transmission modes, dictating that a first transmission mode should be used when the quality of downlink signals received by the UE is above the switching threshold, and that a second transmission mode should be used when the signal quality is below the switching threshold. This threshold condition thus corresponds to the switching mechanism used in the example of FIG. 3. In a further action 502, the radio network node obtains the above-described first and second performance levels when the first and second transmission modes are respectively used. This action 502 basically corresponds to actions 300, 302 above.

The radio network node then determines whether the first performance level is greater than the second performance level plus a first margin, in an action 504. If so, the radio network node is triggered to adjust the switching threshold by decreasing it in another action 506, which corresponds to the case in FIG. 4 where the switching threshold was set to Th3, i.e. too high. This is basically one possible example of adjusting the switching threshold based on the deviation, denoted "x" in FIG. 4, between the first performance level and the second performance level. If the deviation exceeds the first margin in action 504, the adjustment will be executed in action 506 but not otherwise.

If the switching threshold is not adjusted after the determining action 504, the radio network node moves on to determine whether the first performance level plus a second margin is lower than the second performance level, in another action 508. If so, the radio network node is triggered to adjust the switching threshold by increasing it in another action 510, which corresponds to the case in FIG. 4 where the switching threshold was set to Th2, i.e. too low. This is basically another example of adjusting the switching threshold based on the deviation, denoted "y" in FIG. 4, between the first performance level and the second performance level. If the condition in action 508 is not fulfilled, the radio network node may return to action 502 for repeating the procedure while keeping the original setting of the switching threshold.

To conclude, if the deviation between the first performance level and the second performance level exceeds the first margin in action 504 or exceeds the second margin in action 508, the adjustment will be executed in action 506 or action 510, respectively, but not otherwise such that the process may return to action 502 to obtain new updated performance levels that may or may not warrant an adjustment of the switching threshold according to the actions in this flow chart.

Figure 6:
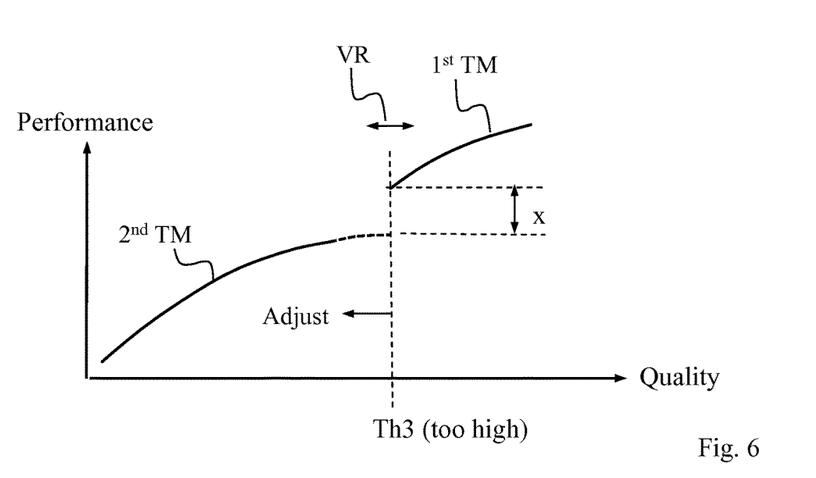
FIG. 6 is a diagram illustrating an example of when the threshold should be decreased, according to further possible embodiments.

The diagram in FIG. 6 illustrates an example where the switching threshold has been set too high, i.e. at Th3 of FIG. 4, meaning that the second transmission mode and its resulting performance are over-estimated. The first performance level and the second performance level are obtained when the quality of downlink signals received by the UE is within a specific vicinity range "VR" from the currently used switching threshold Th3. In other words, the first and second performance levels are obtained when the signal quality is at or close to the switching threshold Th3. The deviation between the obtained first performance level and the obtained second performance level is approximately "x". When the deviation x implies that the first performance level is higher than the second performance level by a first margin, i.e. when x>first margin, the radio network node is triggered to adjust the switching threshold by decreasing it, as indicated by a left-pointing arrow in FIG. 6.

Figure 7:
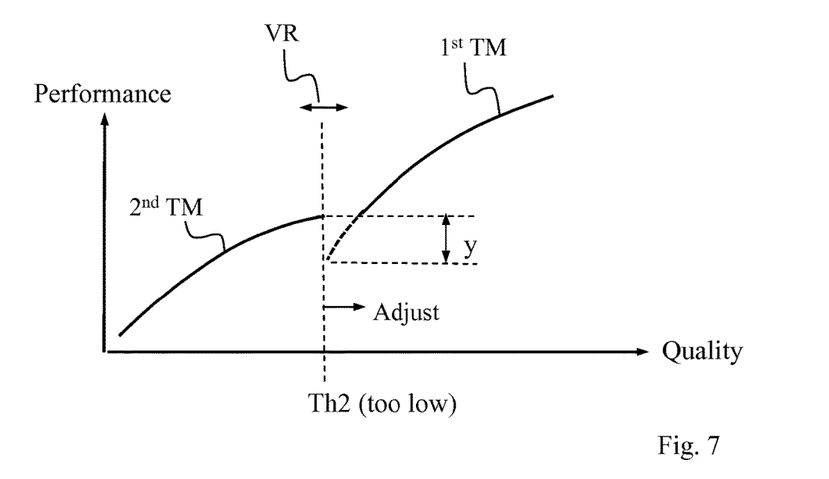
FIG. 7 is a diagram illustrating an example of when the threshold should be increased, according to further possible embodiments.

The diagram in FIG. 7 illustrates another example where the switching threshold has been set too low, i.e. at Th2 of FIG. 4, meaning that the first transmission mode and its resulting performance are over-estimated. The first performance level and the second performance level are obtained when the quality of downlink signals received by the UE is within a specific vicinity range "VR" from the currently used switching threshold Th2. In other words, the first and second performance levels are obtained when the signal quality is at or close to the switching threshold Th2. The deviation between the obtained first performance level and the obtained second performance level is approximately "y" in this example. When the deviation y implies that the first performance level is lower than the second performance level by a second margin, i.e. when y>second margin, the radio network node is triggered to adjust the switching threshold by increasing it, as indicated by a right-pointing arrow in FIG. 7.

Figure 8:
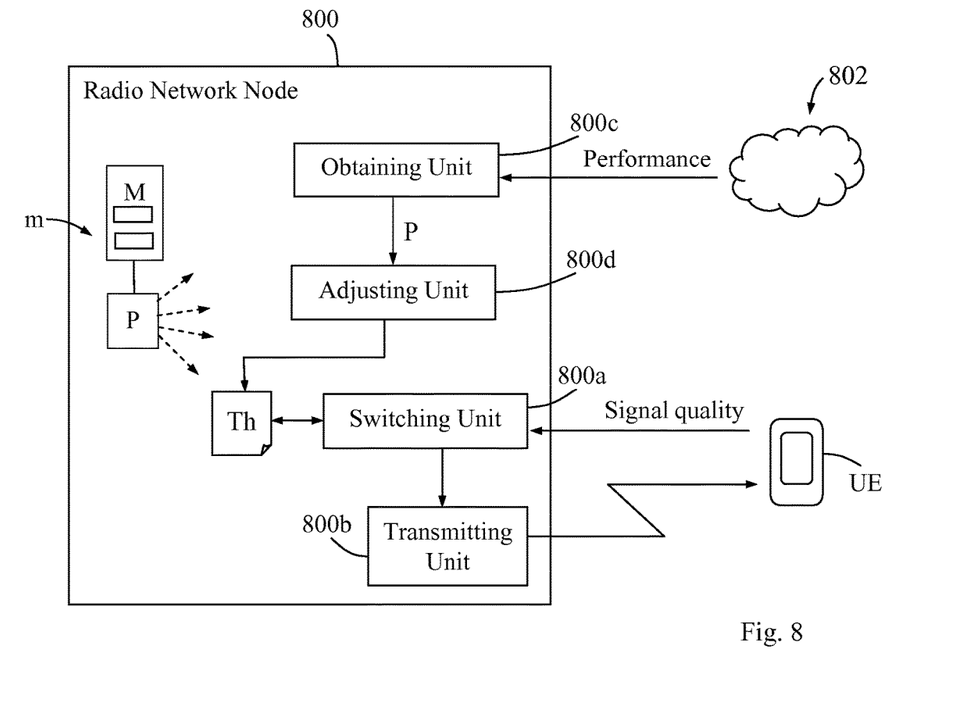
FIG. 8 is a block diagram illustrating a radio network node in more detail, according to further possible embodiments.

A detailed but non-limiting example of how a radio network node of a wireless communication network may be structured with some possible functional units to bring about some or all of the above-described procedures and features, is illustrated by the block diagram in FIG. 8. In this figure, the radio network node 800 is configured for enabling a switch between transmission modes used for sending downlink signals to at least one UE. Only one UE is shown in the figure although the radio network node 800 may operate in the manner described to handle more than one UE. It is assumed that a first transmission mode is used when a quality of downlink signals received by the at least one UE is above a switching threshold, and that a second transmission mode is used when said quality is below the switching threshold. The radio network node 800 may be configured to operate according to any of the examples described above and as follows. The radio network node 800 will now be described in terms of a possible example of employing the solution.

The radio network node 800 comprises a switching unit 800a configured to switch between transmission modes used for sending downlink signals to the at least one UE. In this regard, the switching unit 800a is configured to select a first transmission mode when a quality of downlink signals received by the at least one UE is above a switching threshold, and to select a second transmission mode when said quality is below the switching threshold. The radio network node 800 also comprises a transmitting unit 800b configured to transmit the downlink signals to the at least one UE using one of the first and second transmission modes.

The radio network node 800 further comprises an obtaining unit 800c configured to obtain a first performance level pertaining to reception of the downlink signals in the at least one UE when the first transmission mode is used for sending the downlink signals and the quality of downlink signals received by the at least one UE is within a specific vicinity range from the switching threshold. The obtaining unit 800b is also configured to obtain a second performance level pertaining to reception of the downlink signals in the at least one UE when the second transmission mode is used for sending the downlink signals and the quality of downlink signals received by the at least one UE is within the specific vicinity range from, or around, the switching threshold. The obtaining unit 800c may thus operate as described for actions 300 and 302 above.

The radio network node 800 further comprises an adjusting unit 800d configured to adjust the switching threshold based on a deviation between the first performance level and the second performance level. The adjusting unit 800d may thus operate as described for actions 304, 306 and 308 above.

It should be noted that FIG. 8 illustrates various functional units in the radio network node 800, and the skilled person is able to implement these functional units in practice using suitable software and hardware. Thus, the solution is generally not limited to the shown structures of the radio network node 800, and the functional units 800a-d may be configured to operate according to any of the features described in this disclosure, where appropriate.

The functional units 800a-d described above may be implemented in the radio network node 800 by means of program modules of a respective computer program comprising code means which, when run by a processor "P" in the radio network node 800 causes the radio network node 800 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the radio network node 800 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the radio network node 800.

The above radio network node 800 and its functional units 800a-d may be configured or adapted to operate according to various optional embodiments. In some possible embodiments, the adjusting unit 800d may be configured to decrease the switching threshold when the first performance level is higher than the second performance level, e.g. as illustrated in FIG. 6 and described for action 506 above. In that case, the adjusting unit 800d may be configured to decrease the switching threshold when the first performance level is higher than the second performance level by a first margin.

In further possible embodiments, the adjusting unit 800d may be configured to increase the switching threshold when the first performance level is lower than the second performance level, e.g. as illustrated in FIG. 7 and described for action 510 above. In that case, the adjusting unit 800d may be configured to increase the switching threshold when the first performance level is lower than the second performance level by a second margin.

While the solution has been described with reference to specific exemplary embodiments, the description is generally only intended to illustrate the inventive concept and should not be taken as limiting the scope of the solution. For example, the terms "radio network node", "User Equipment, UE", "switching threshold", "Transmission Mode, TM", "performance level" and "margin" have been used throughout this description, although any other corresponding entities, functions, and/or parameters could also be used having the features and characteristics described here. The solution is defined by the appended claims.

The invention claimed is:

1. A method in a radio network node of a wireless communication network, for enabling a switch between transmission modes used for sending downlink signals to at least one User Equipment, UE, wherein a first transmission mode is used when a quality of downlink signals received by the at least one UE is above a switching threshold and a second transmission mode is used when said quality is below the switching threshold, the method comprising:

obtaining a first performance level pertaining to reception of the downlink signals in the at least one UE when the first transmission mode is used for sending the downlink signals and the quality of downlink signals received by the at least one UE is within a specific vicinity range from the switching threshold, obtaining a second performance level pertaining to reception of the downlink signals in the at least one UE when the second transmission mode is used for sending the downlink signals and the quality of downlink signals received by the at least one UE is within the specific vicinity range from the switching threshold, determining a deviation between the first performance level and the second performance level; and adjusting the switching threshold when the deviation is greater than a margin, wherein adjusting the switching threshold comprises:

decreasing the switching threshold when the first performance level is higher than the second performance level by the margin.

2. The method according to claim 1, wherein adjusting the switching threshold further comprises increasing the switching threshold when the first performance level is lower than the second performance level.

3. The method according to claim 2, wherein the switching threshold is increased when the first performance level is lower than the second performance level by the margin.

4. The method according to claim 1, wherein the first and second performance levels pertain to downlink throughput.

5. A radio network node of a wireless communication network, the radio network node comprising:

a processor configured to switch between transmission modes used for sending downlink signals to at least one User Equipment, UE, and to select a first transmission mode when a quality of downlink signals received by the at least one UE is above a switching threshold, and to select a second transmission mode when said quality is below the switching threshold, a transmitter coupled to the processor, the transmitter configured to transmit said downlink signals to the at least one UE using one of the first and second transmission modes, the processor further configured to:

obtain a first performance level pertaining to reception of the downlink signals in the at least one UE when the first transmission mode is used for sending the downlink signals and the quality of downlink signals received by the at least one UE is within a specific vicinity range from the switching threshold, and configured to obtain a second performance level pertaining to reception of the downlink signals in the at least one UE when the second transmission mode is used for sending the downlink signals and the quality of downlink signals received by the at least one UE is within the specific vicinity range from the switching threshold,     determine a deviation between the first performance level and the second performance level; and     adjust the switching threshold when the deviation is greater than a margin, wherein the processor is configured to decrease the switching threshold when the first performance level is higher than the second performance level by the margin.

6. The radio network node according to claim 5, wherein the processor is configured to increase the switching threshold when the first performance level is lower than the second performance level.

7. The radio network node according to claim 6, wherein the processor is configured to increase the switching threshold when the first performance level is lower than the second performance level by the margin.

8. The radio network node according to claim 5, wherein the first and second performance levels pertain to downlink throughput.

* * * * *